United States Patent [19]

Jones et al.

[11] Patent Number: 4,543,244
[45] Date of Patent: Sep. 24, 1985

[54] USE OF HIGH SILICON CR NI STEEL IN $H_2SO_4$ MANUFACTURE

[75] Inventors: Frederick W. S. Jones, Campbellville, Canada; Frank Smith, Widnes, England

[73] Assignee: C-I-L Inc., Montreal, Canada

[21] Appl. No.: 502,500

[22] Filed: Jun. 9, 1983

[30] Foreign Application Priority Data

Jun. 11, 1982 [CA] Canada ................................ 404962

[51] Int. Cl.$^4$ ...................... C01B 17/98; C01B 17/74; C01B 17/48; B01J 1/20
[52] U.S. Cl. .................................. 423/522; 423/531; 423/529; 423/532; 422/161; 422/240; 75/128 C; 202/267 R
[58] Field of Search ............... 423/522, 532, 533, 529, 423/531; 75/128 C; 422/160, 161, 240; 202/267 R

[56] References Cited

U.S. PATENT DOCUMENTS

| | | | |
|---|---|---|---|
| 1,420,707 | 1/1922 | Johnson | 75/128 |
| 2,920,954 | 1/1960 | Mott | 75/128 |
| 3,785,787 | 1/1974 | Yokota et al. | 75/128 C |
| 4,002,510 | 1/1977 | Wilde | 75/128 C |
| 4,039,356 | 8/1977 | Schumacker et al. | 75/128 C |
| 4,146,412 | 3/1979 | Schumacker et al. | 75/128 C |
| 4,279,648 | 7/1981 | Ito et al. | 75/128 C |

FOREIGN PATENT DOCUMENTS

| | | | |
|---|---|---|---|
| 13507 | 7/1980 | European Pat. Off. | 75/128 C |
| 0018124 | 10/1980 | European Pat. Off. | |
| 1261809 | 1/1972 | United Kingdom. | |
| 1314601 | 4/1973 | United Kingdom. | |
| 1534926 | 12/1978 | United Kingdom. | |
| 1582504 | 1/1981 | United Kingdom. | |
| 1595755 | 8/1981 | United Kingdom. | |

OTHER PUBLICATIONS

Fyfe et al, Corrosion in Sulfuric Acid Storage Tank, CEP, Mar., 1977, pp. 65-69.
Rinckoff et al, Design Options for Sulfuric Acid Plants, CEP, Mar. 77, pp. 79-84.
"Development, Properties, Processing and Applications of High-Silicon Grade X2 CrNiSi 1815," Z. Werkstofftech, 8, 362-370 (1977), E. M. Horn-A. Kügler.
"Ibid", 410-417.
"Eurocor", '77, 6th European Congress on Metallic Corrosion, Society Chemical Industry, London, 1977, 61-68.
"New Austenitic Stainless Steels", A. Baumel, E. Horn, and H. Grafen, 5th International Congress on Metallic Corrosion, pp. 934-941, May 1972, National Research Institute for Metals, Japan, published by the National Association of Corrosion Engineers, in 1974, Houston, Texas.
"Austenitic Stainless Steel with Approximately 5.3% Si", G. Hochörtler, and E. M. Horn, 8th International Congress on Metallic Corrosion, Sep. 1981, Mainz, Germany, book published by Dechema, 1981, 2, 1447-1452.

Primary Examiner—Gary P. Straub
Attorney, Agent, or Firm—Cushman, Darby Cushman

[57] ABSTRACT

Apparatus and process for the manufacture of sulphuric acid by the contact process of the type comprising at least one gas-concentrated sulphuric acid contacting unit and a sulphuric acid heat exchanger characterized in that the contacting unit and/or heat exchanger is formed of high silicon content austenitic steel. The steel is also of use in sulphuric acid concentrators. Reduced corrosion rates are provided.

19 Claims, 9 Drawing Figures

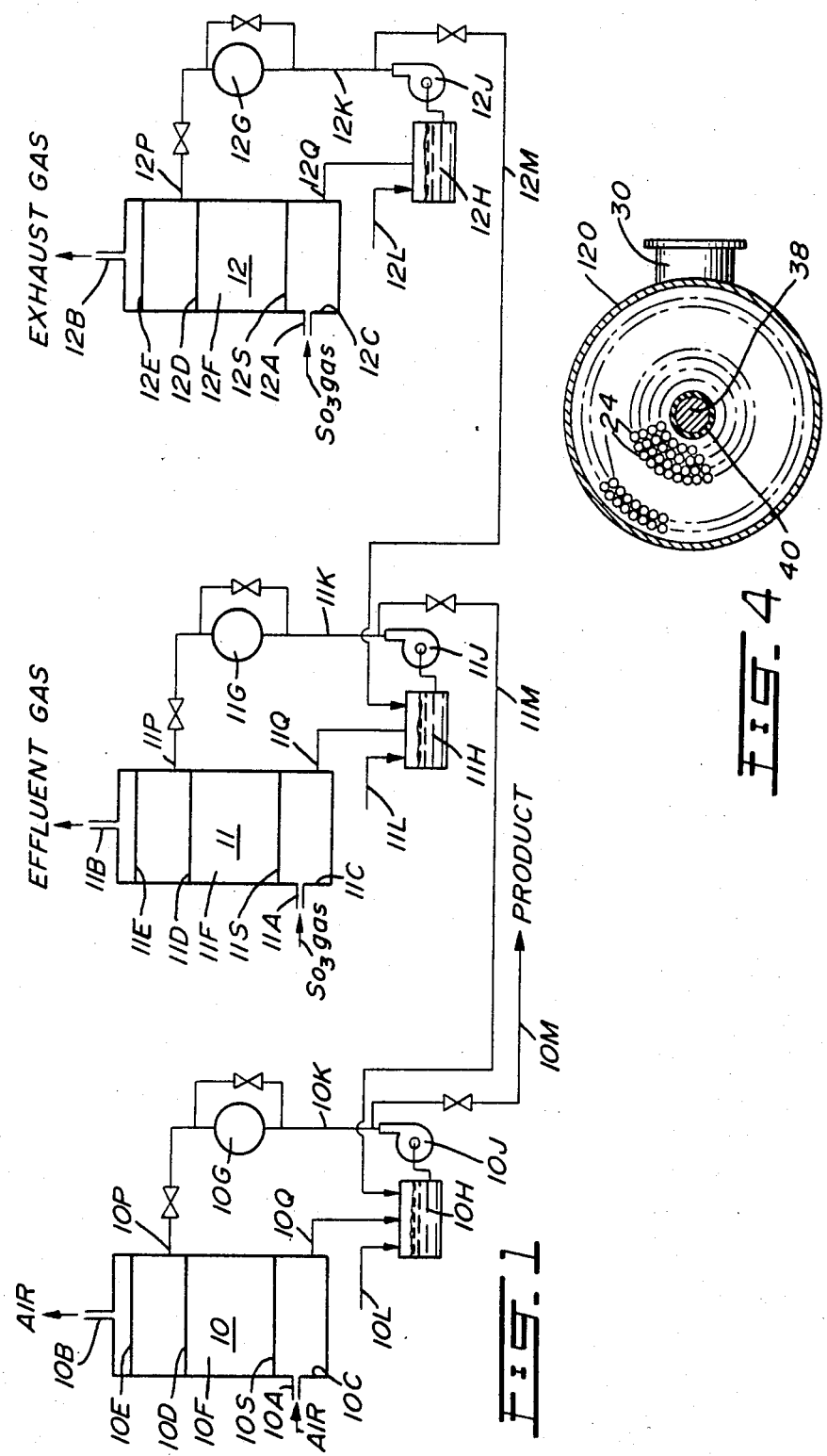

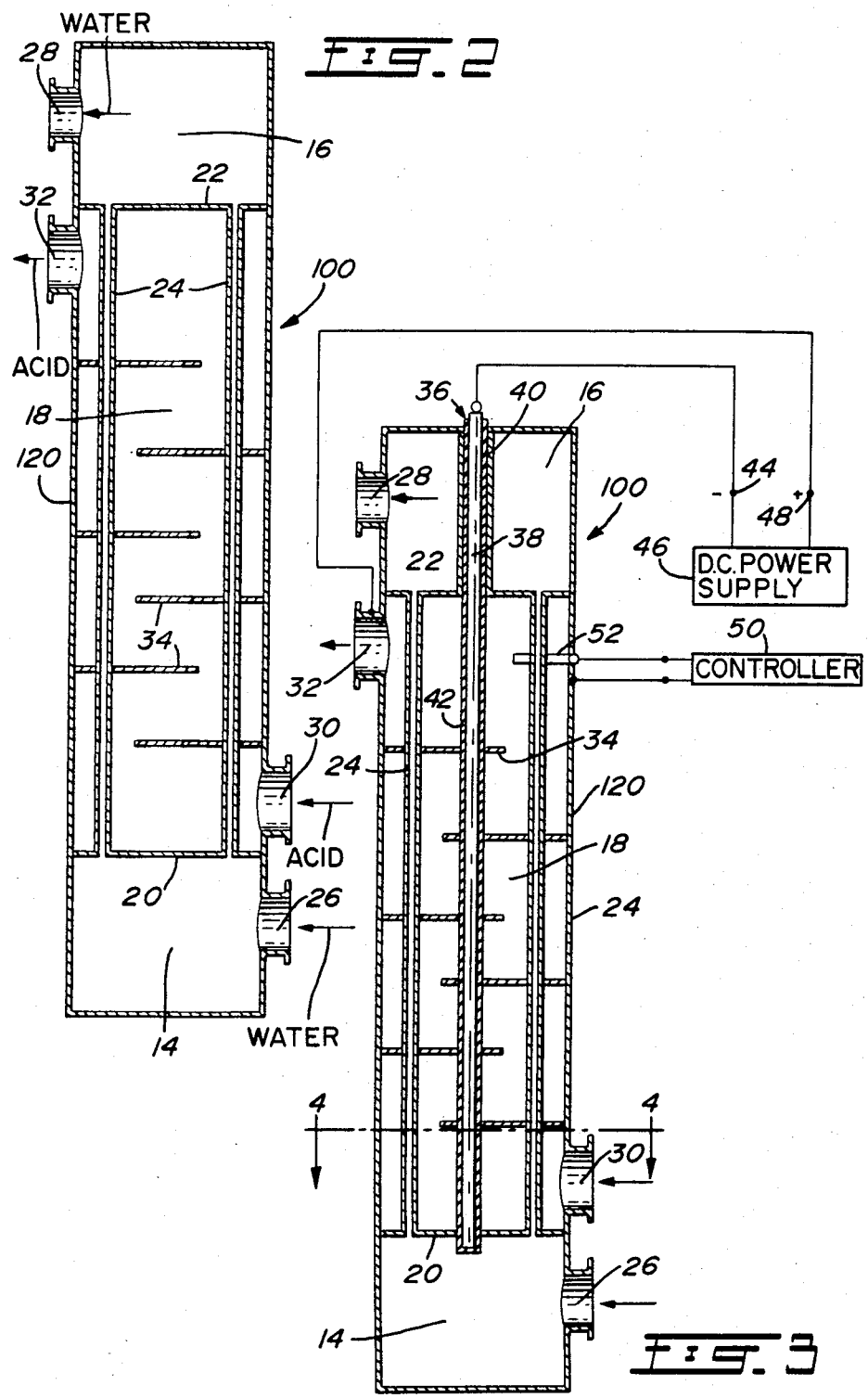

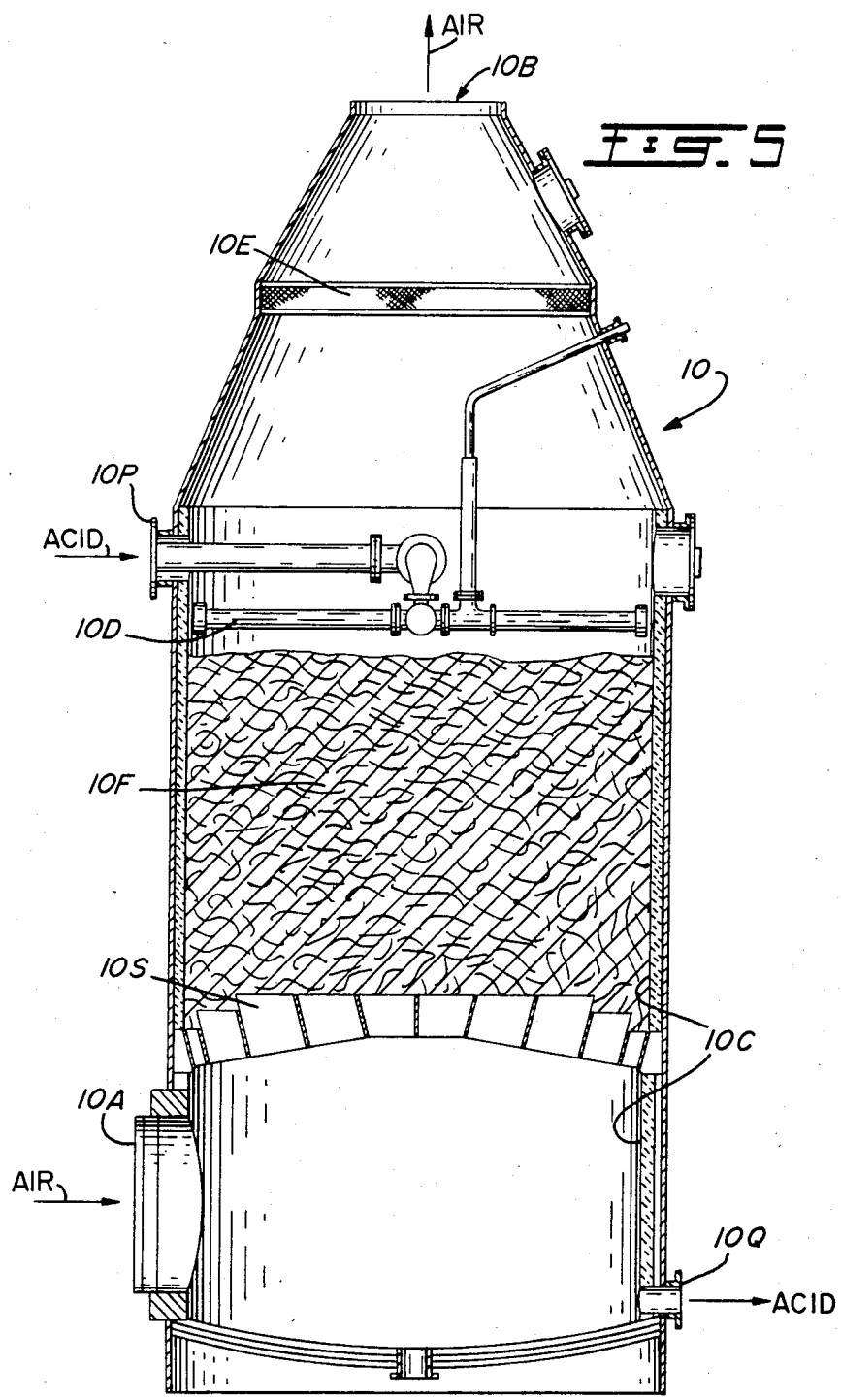

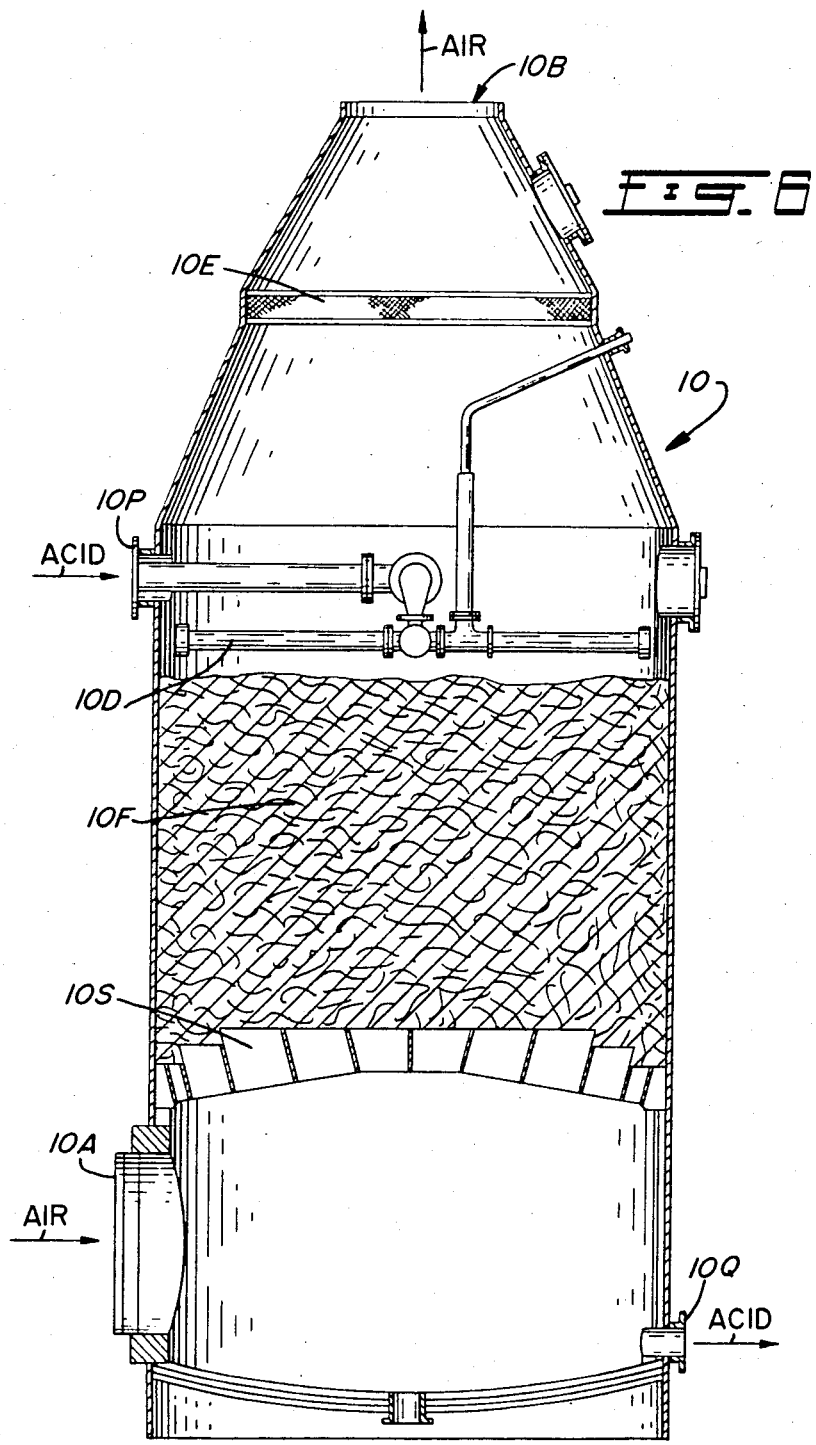

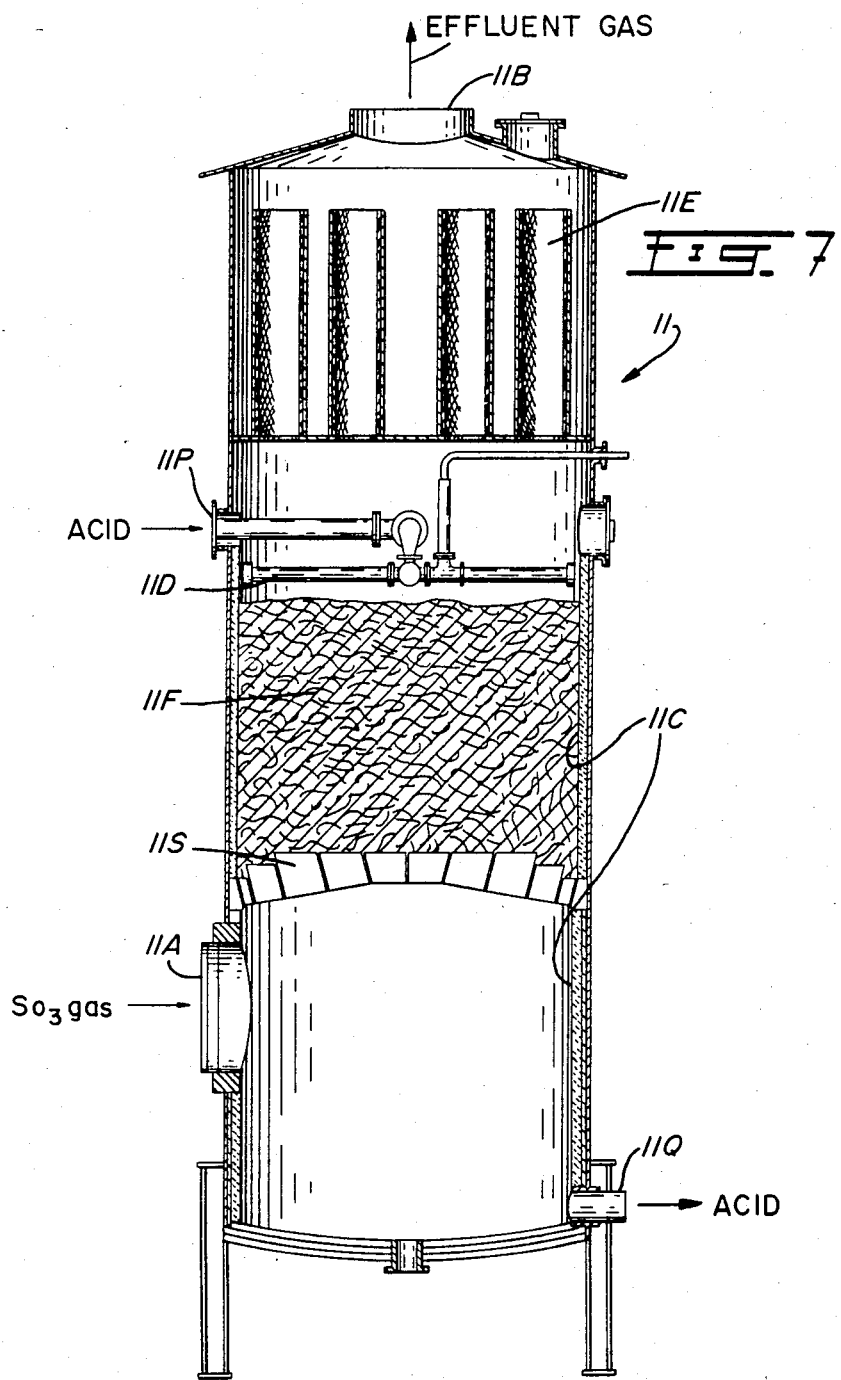

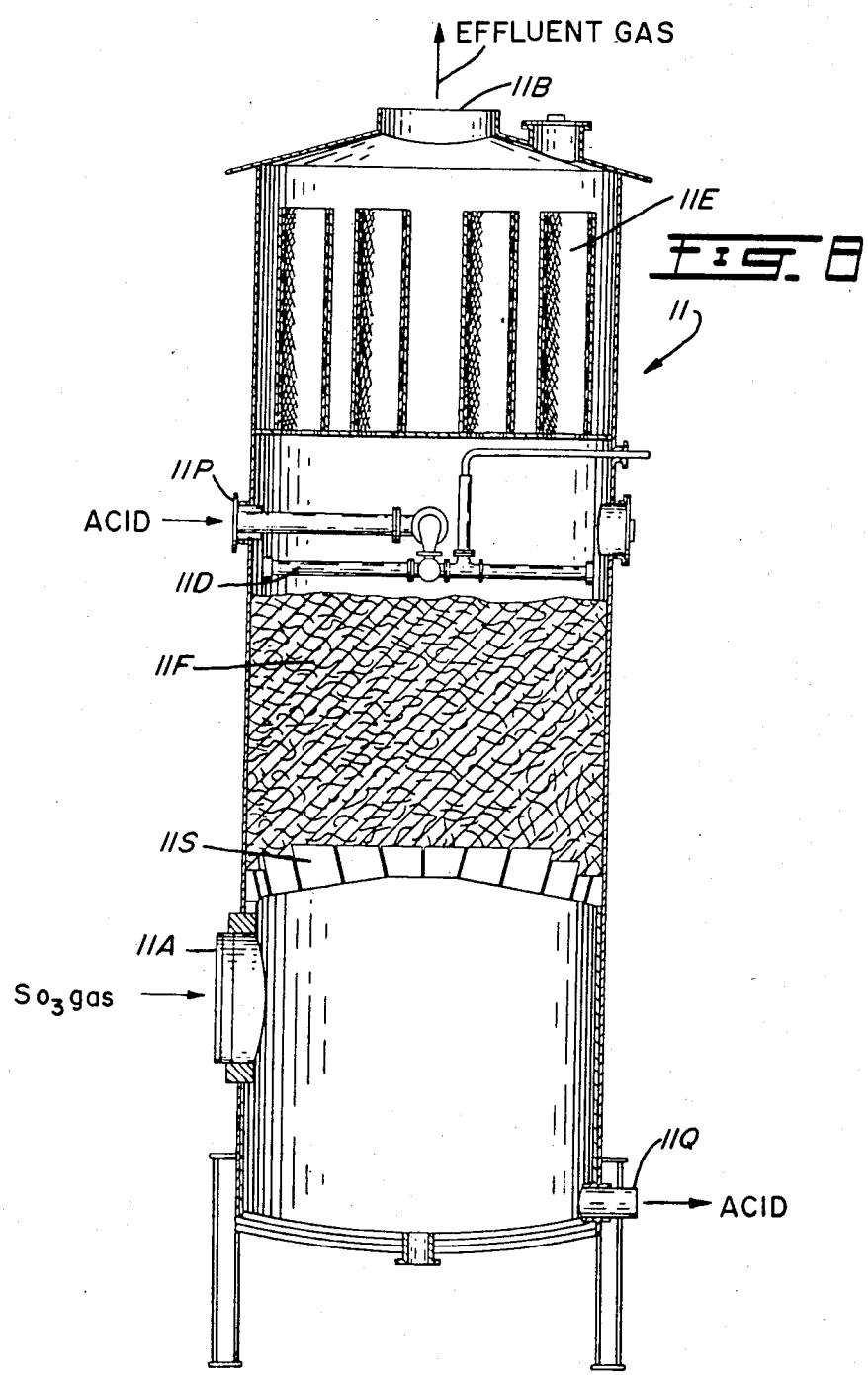

USE OF HIGH SILICON CR NI STEEL IN H₂SO₄ MANUFACTURE

This invention relates to apparatus and processes for the manufacture of sulphuric acid and more particularly to apparatus formed of austenitic stainless steel.

Sulphuric acid is normally manufactured by burning elemental sulphur in previously dried air to produce sulphur dioxide from which sulphur trioxide is formed and absorbed in concentrated sulphuric acid where it reacts with water to form additional sulphuric acid. A similar route to sulphuric acid from metallurgical gases exists in which sulphur dioxide-containing gas is dried and the sulphur dioxide converted to sulphur trioxide. The process subsequently is as previously described. Both of these processes involve the oxidation of sulphur dioxide to sulphur trioxide followed by absorption in sulphuric acid. This is generally known as the contact process for the manufacture of sulphuric acid.

Some important operations involving sulphuric acid in its manufacture are drying, absorbing and cooling. Acid strengths are of the order of 93%–99.5% sulphuric acid in these operations. The temperature of these strong or concentrated acids is generally in the range 40° C.–115° C.

Concentrated sulphuric acid is corrosive to most metals, particularly in the higher temperature range (>100° C.), and it is highly desirable that all of the components of a sulphuric acid manufacturing system such as contacting towers, heat exchangers, piping, valves, pumps, distributors, and the like, that contact sulphuric acid should be of corrosion resistant materials. At the present time such systems are built of cast iron, brick, various plastic, and non-metallic materials, and various highly expensive corrosion resistant alloys. These materials are not completely satisfactory, however. For example, acid brick can only be fabricated in specific shapes, can swell on extended exposure to concentrated sulphuric acid and require expensive mortars and labour for installation. Also, attack of the carbon steel shell beneath the bricks can produce sulphation which disrupts the shell and/or the bricks. The metallic components used have significant rates of corrosion and unless specially protected or very highly alloyed, have limited life in service.

The highly alloyed materials and the cast irons are also limited in terms of fabricability, which puts limitations on plant design and results in more flanges, fittings, cost, and areas of potential leakage.

In regards energy recovery, temperature levels at which rates of corrosion are acceptable are relatively low which makes recovery of the large quantities of waste heat in sulphuric acid cooling systems very difficult. Classically, energy transport in sulphuric acid plant is in the form of steam which even at the lowest pressures used is at a temperature of over 115° C., the hottest temperature now tolerable in concentrated acid.

One technique which has been developed over the last decade to reduce corrosion is the use of anodic protection with materials which can be electrochemically protected. Sulphuric acid heat exchangers, which represent a major cost in acid manufacturing systems are now normally fabricated of austenitic stainless steel of the 300 series (18% Cr—8% Ni). These steels depend on an oxide film for corrosion resistance and are only useful without anodic protection at much reduced temperatures, such as for instance 55°–65° C. in 98% acid. Above this temperature in the presence of turbulence, severe corrosion is found which can completely destroy equipment in a few months. Electrochemical generation of the oxide film by the use of anodic protection has been found to substantially reduce this corrosion and the existing stainless steels can now be used at acid temperatures up to 120° C.–125° C.

Stainless steels are a series of alloys based on iron with generally a minimum of 12% Cr to impart corrosion resistance. The addition of nickel to the iron/chromium alloy alters the crystal structure from body centred cubic to face centred cubic and the resultant phase is termed austenite. This family of materials based on Fe, Cr and Ni is termed the austenitic stainless steels.

Significant efforts have been made to extend the range of applicability of austenitic alloys in high temperature, high strength acid (>90%) systems. This has involved a study of a variety of normally useful alloying elements such as molybdenum, nickel, copper, and chromium. Increased silicon content is also possible but gives only marginal, if any, improvement in corrosion resistance in concentrated sulphuric acid, and is not generally industrially useful as the silicon alloyed material is significantly more difficult to make and also much more expensive.

It is known that stainless steels containing 4% silicon have acceptable corrosion resistance to 98% sulphuric acid at moderate temperatures (Ca. 80° C.) although the behaviour is not much different from the behaviour of the standard austenitic stainless steels without silicon. With the additional costs associated with the addition of silicon and the compensating addition of more nickel to maintain the austenitic structure, no use has therefore been made of such alloys in this environment.

Silicon containing alloys also have been tested in dilute sulphuric acid environments and offer unacceptable levels of corrosion and so have not been used in this area either.

In their prime area of utility, the austenitic stainless steels containing up to 5.3% silicon have been used successfully in the manufacture of concentrated nitric acid especially in the range 98%–100% acid where the corrosion resistance of the classic non-silicon containing grades falls off and here increasing silicon content helps in reducing corrosion, although no drastic effects of silicon level are noted.

Addition of silicon to austenitic stainless steels has a significant effect on the structure of the alloy produced and requires changes in the content of other alloying elements such as nickel which must be increased to maintain the austenitic nature of the alloy. In addition, workability and ability to fabricate the material are also compromised by increasing the silicon content making the high silicon containing alloy expensive by comparison with lower alloys. Up to the classic level of 4% silicon, the improvement in performance has been sufficient in some nitric acid environments to justify the additional expense but the same conclusion has not been found for concentrated sulphuric acid.

Surprisingly, we have now found that austenitic stainless steels with a relatively high silicon content have a much greater corrosion resistance to hot concentrated sulphuric acid than either the normal austenitic stainless steels, such as 304 and 316 of the 300 series, or the normal silicon containing grades having up to 4% Si content. In addition, unlike any of the higher alloyed austenitic stainless steels previously described with higher chromium, nickel, or molybdenum contents, these high silicon content stainless steels also are adaptable for anodic protection.

We have further found that concentrated sulphuric acid can be manufactured at much higher temperatures than heretofore possible with acceptable corrosion.

Accordingly, the present invention provides apparatus for the manufacture of sulphuric acid by the contact process of the type comprising at least one gas-concentrated sulphuric acid contacting unit and a sulphuric acid heat exchanger characterised in that said contacting unit and/or heat exchanger is formed of an austenitic steel containing 4.6% to 5.8% silicon.

By the term "gas-concentrated sulphuric acid contacting unit" is meant a sulphuric acid drying tower wherein water present in the air and in the sulphur dioxide used in the contact process is removed, and/or a sulphuric acid absorption tower wherein sulphur trioxide is absorbed in concentrated sulphuric acid.

The drying towers and the absorption towers are generally provided with acid distributors and mist eliminators. Some contact process plants, namely, the so-called "wet-process" plants, do not utilize a drying tower.

A typical contact process plant in addition to having one or more drying towers, absorption towers and a heat exchanger also requires an acid circulation system comprising pump tanks or reservoirs, acid pumps, and a piping and valve system. In such prior art systems the pump tank is formed typically of carbon steel with acid resistant brick lining to reduce corrosion by the hot acid. The pump is generally formed of expensive corrosion resistant alloy, the acid distributor and the piping and valve system of cast iron, and the mist eliminator of a stainless steel framework with glass fibre elements. However, we have now found that such a system when formed of relatively high silicon content austenitic steel has enhanced corrosion resistance.

Further, as demisters are generally in the form of pads, candles or panels, the use of a high silicon content austenitic steel framework will allow lighter demisters to be used and higher temperatures to be tolerated through the towers.

Prior art distributors generally comprise heavy wall cast iron pipe sections with flanged, bolted connections and screw end caps with the pipes having holes fitted with polytetrafluoroethylene nozzles to reduce acid corrosion through the orifices. A distributor formed of high silicon content austenitic steel provides an all-welded alternative with or without PTFE nozzle inserts. This allows a simple and lighter construction and a higher operating temperature.

Accordingly, in a further aspect the invention provides apparatus for the manufacture of sulphuric acid by the contact process of the type comprising (a) at least one gas-concentrated sulphuric acid contacting unit;

(b) a mist eliminator in said gas-concentrated sulphuric acid contacting unit;

(c) an acid distributor in said gas-concentrated contacting unit;

(d) a sulphuric acid heat exchanger; and an acid circulation system by which acid is circulated to said contacting unit and heat exchanger; comprising (e) a pump tank;

(f) an acid pump; and an (g) acid piping and valve system; characterised in that one or more of said components (a) to (g) inclusive is formed of an austenitic steel containing 4.6% to 5.8% silicon.

Preferably all of said components (a) to (g) inclusive are formed of said austenitic steel. In a more preferred aspect the apparatus further comprises one or more of said components selected from the heat exchanger (d), pump tank (e), pump (f) and acid piping and valve system (g) provided with anodic protection means. More preferably all of said components (d) to (g) inclusive are provided with anodic protection means.

In yet a further aspect the invention provides individual components of a sulphuric acid manufacturing plant selected from the group of components consisting of a drying tower, absorption tower, mist eliminator of said drying tower or absorption tower, acid distributor of said drying tower or absorption tower, heat exchanger, sulphuric acid pump tank, sulphuric acid pump, and sulphuric acid piping and valve system, characterised in that said component is formed of an austenitic steel containing 4.6% to 5.8% silicon.

As hereinbefore mentioned, by the term austenitic steel in this specification and claims is meant a steel comprising Fe, Ni and Cr in such ratios that the steel is in the austenitic state. More specifically the austenitic steel of use in the practice of the invention comprises Fe, Cr, Ni and Si. It is also understood that the austenitic steel of use in the invention may further comprise other elements, such as for example, Mn to enhance austenitic stabilization, and other elements as alloying agents, without detracting from the utility of the invention.

It is not necessary that the whole of each individual component be formed of the austenitic steel of use in the practice of the invention It will be appreciated, however, that it is highly desirable that all of those parts of the component which contact sulphuric acid, particularly hot concentrated acid, liquid or vapour, be formed of such austenitic steel. Thus the invention provides said components in whole or in part formed of such austenitic steel.

Preferably, the austenitic steel of use in the practice of the invention contains 5.0% to 5.6% Si. More preferably the steel has the composition 17.5% Ni, 17.5% Cr, 5.3% Si, <0.015% C, the balance being substantially Fe.

As briefly mentioned, hereinbefore, it has now been found that concentrated sulphuric acid can be manufactured at much higher temperature levels than heretofore operated at acceptable corrosion rates. Thus, absorption may be effected at a temperature in the range 120°–180° C. as compared to conventional operations conducted in the range 60°–120° C. without undue corrosion.

Accordingly, in yet a further aspect the invention provides a process for the manufacture of sulphuric acid by the contact process of the type comprising the steps of passing air, sulphur dioxide, sulphur trioxide, or mixtures thereof through one or more gas-concentrated sulphuric acid contacting units A, said unit being optionally provided with a mist eliminator B and an acid distributor C, passing concentrated sulphuric acid through a heat exchanger D; and circulating sulphuric acid to said contacting unit and heat exchanger through a circulation system comprising a pump tank E, acid pump F, and a pipe and valve system G, characterised in that one or more of said integers A to G inclusive is formed in whole or in part of an austenitic steel containing 4.6% to 5.8% silicon.

In a further aspect the invention provides a process as hereinbefore defined wherein one or more, preferably all, of said components selected from heat exchanger (D), pump tank (E), acid pump (F) and piping and valve system (G) is anodically protected.

In a preferred aspect the temperature of the circulating sulphuric acid entering the heat exchanger is in the range 120° C.-180° C. more preferably in the range 150° C.-170° C.

Thus, it can be readily seen that a plant and process according to the invention may be either operated at conventional temperatures, which results in greatly reduced corrosion, or, operated at elevated temperatures to effect enhanced energy recovery with acceptable corrosion. The advantage of either of these options is enhanced if anodic protection is provided.

The invention also provides apparatus and processes for concentrating sulphuric acid.

Sulphuric acid is normally concentrated by boiling water from it. One method is to apply direct oil-fired heat to a concentrator vessel in the form of a cast iron pot containing the acid and provided with a silicon cast iron agitator. Acid is fed to the pot from a packed column and when concentrated overflows through acid coolers to storage or pump tanks. The charge is typically waste or contaminated 70% acid, which is concentrated to about 96%. Normal operational temperature is Ca. 290° C. for the acid which can give pot wall temperatures of the order of 350° C. and above depending on the mode of heating. The main drawback of such a concentrator system is the corrosion and cracking of the pot. Anodic protection is optionally applied to prolong pot life.

Another system used for concentrating acid is to use a concentrator vessel in the form of a drum formed of lead-lined mild steel having an inner brick lining. Concentration is achieved by countercurrent contact with hot gas at a temperature of 600°-675° C. played on and into the acid. The acid charge is generally 70% acid and it leaves the drum as 93% acid at a temperature of 230° C. The hot acid product is generally used to preheat the incoming acid by means of a tantalum heat exchanger. The drum concentrator vessel is generally satisfactory but expensive and subject to brickwork erosion/corrosion. It is generally inefficient and can cause problems with contaminated gaseous effluent.

Yet another sulphuric acid concentration process is used wherein the boiling is usually carried out by inserting a heating element, typically containing tantalum boiler tubes, inside the concentrator vessel used to boil the liquid. It is found that sulphuric acid at a temperature exceeding 190° C. will usually attack tantalum. Therefore sulphuric acid must be concentrated at a temperature such that the skin temperature of the tantalum tubes is less than 190° C., and this temperature limitation necessitates a substantial reduction of pressure in the evaporator. Because of the reduced pressure in the evaporator, a complex vacuum system is used to condense the water boiled off the acid. The vacuum system usually includes a steam ejector to increase the pressure sufficiently to condense the water vapor. The capital and steam operating costs of the vacuum system and of the tantalum heater tubes are high, particularly in plants used to produce higher concentration acid such as 96% sulphuric acid.

Accordingly, it is an object of the invention to provide apparatus and a process for concentrating sulphuric acid in a concentrator so that reduced maintenance due to corrosion problems is achieved and that higher operating temperatures than hereto before used can be attained to allow higher strength acid to be produced. In its broadest aspect this invention provides apparatus for concentrating sulphuric acid from a strength of 85%, preferably 90% acid of the type comprising a concentrator vessel characterised in that the concentrator vessel is formed in whole or in part of an austenitic steel containing 4.6% to 5.8% silicon. By "concentrator vessel" is meant a pot, drum, vacuum evaporator vessel, or the like wherein sulphuric acid in the vessel is heated either directly or indirectly, by a direct flame, heating coil or jacketed steam pipe or electrical, heat exchanger, or via a thermosyphon loop.

It is to be understood that the apparatus according to the invention is also of use in acid concentrator systems wherein feed acid is of $<85\%$ strength, typically 70%, which is pre-concentrated to 85%, preferably 90%, strength prior to contacting the austenitic steel of the concentrator vessel.

The sulphuric acid charge is generally pre-heated in acid concentrator systems. Preferably the austenitic steel contains 5.0% Si to 5.6% Si. More preferably, the austenitic steel has the composition 17.5% Ni, 17.5% Cr, 5.3% Si, $<0.015\%$ C, the balance being substantially Fe.

The apparatus may optionally be provided with anodic protection means, and air extraction means.

The concentrator apparatus according to the invention also finds applicability in the destructive heating of organic matter in sulphuric acid waste liquors contaminated with the organic matter, where corrosion of the concentrator vessel is a problem as hereinbefore described.

Further objects and advantages of the invention will appear from the preferred embodiments now described by way of example only with reference to the accompanying drawings in which:

FIG. 1 shows diagrammatically a plant for the production of sulphuric acid by the contact process as known in the prior art and, when modified, according to the invention;

FIG. 2 shows diagrammatically a heat exchanger of use in the manufacture of sulphuric acid as known in the prior art and, when modified, according to the invention;

FIG. 3 is a schematic view showing a heat exchanger with an anodic protection system installed therein as known in the prior art and, when modified, according to the invention;

FIG. 4 is a sectional view taken along the lines 2—2 of FIG. 3;

FIG. 5 is a vertical sectional view of a conventional drying tower of use in the sulphuric acid plant of FIG. 1;

FIG. 6 is the drying tower of FIG. 5 modified according to the invention;

FIG. 7 is a vertical sectional view of a conventional absorption tower of use in the sulphuric acid plant of FIG. 1;

FIG. 8 is the absorption tower of FIG. 7 modified according to the invention.

Figure 9:
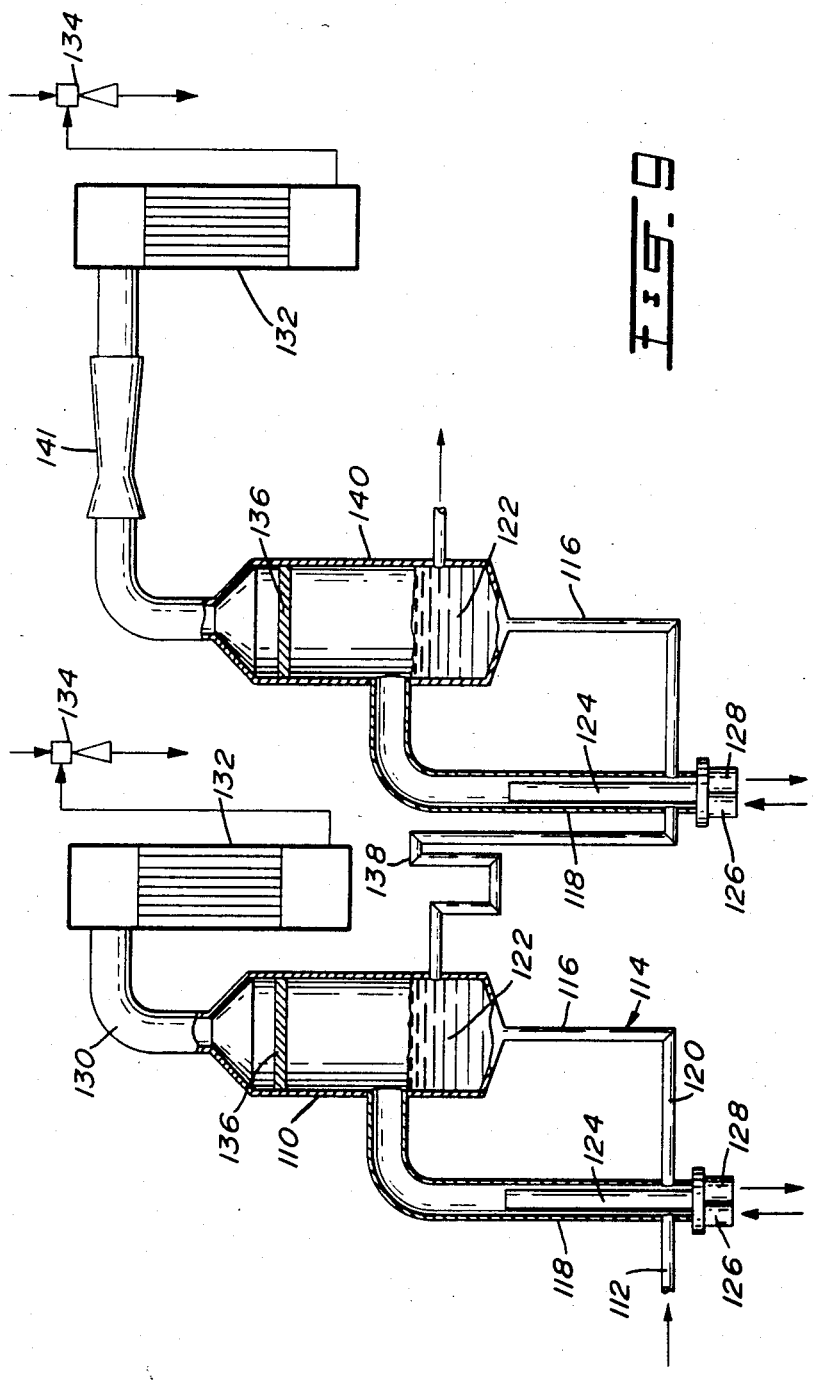
FIG. 9 is a diagrammatic view of a portion of a typical prior art sulphuric acid concentration system as known in the prior art and, when modified, according to the invention.

The apparatus shown in FIG. 1 includes as gas-concentrated sulphuric acid contacting units three towers, namely a drying tower 10, an intermediate absorption tower 11, and a final absorption tower 12. Each of these towers has a gas inlet A at the bottom and a gas outlet B at the top. Each tower has an acid inlet P at the top, and an acid outlet Q at the bottom. Each of the towers is formed of carbon steel and lined with acid-resistant brick lining C. In the upper part of each tower is a cast iron acid distributor D above which is a mist eliminator E formed of glass fibre contained in a stainless steel frame. Each tower is filled with a ceramic packing F supported by a ceramic support S and through which gas or air and acid percolate to produce a full and intimate contact therebetween. Also shown in the drawing are three anodically protected stainless steel sulphuric acid heat exchangers G in which heat is rejected to cooling water.

The drawing also includes an acid circulation system comprising pump tanks or reservoirs H, circulating pumps J, and a piping and valve system K.

The acid outlets 10Q, 11Q, and 12Q drain into pump tanks 10H, 11H, 12H, respectively, which are formed of carbon steel with acid resistant brick linings. Pumps 10J, 11J, 12J are formed of expensive corrosion resistant alloy and cast iron and circulate the acid from the tanks 10H, 11H, 12H through heat exchangers 10G, 11G, 12G, to the towers 10, 11, 12, through the cast iron piping and valve system 10K, 11K, 12K. The piping and valve system also includes water addition streams L, by which the water requirements for the acid produced are met, and acid transfer lines M.

In operation the process gas circulation system of the apparatus follows normal practice. Air enters the drying tower 10 through inlet 10A and is dried by contact with a countercurrent stream of hot concentrated sulphuric acid which enters the tower through inlet 10P and distributed across the packing 10F by distributor 10D. Dried air leaves the tower via outlet 10B and sulphuric acid by outlet 10Q. Mist entrained in the dried air is removed in mist eliminator 10E. Sulphur is burned with the dry air in a sulphur burner (not shown) to produce sulphur dioxide. The process gas, which is now a mixture of air and sulphur dioxide, then passes through a catalytic converter (not shown) where the majority of the sulphur dioxide is converted into sulphur trioxide. The process gas, laden with $SO_3$ and unconverted $SO_2$, enters the intermediate absorption tower 11 through inlet 11A. The $SO_3$ is absorbed from this intermediate gas stream by countercurrent contact in packing 11F with a stream of concentrated sulphuric acid which enters the tower via system 11K and inlet 11P and distributed therein by distributor 11D. The absorbed $SO_3$ exits through outlet 11Q and reacts with water injected from 11L into tank 11H to form sulphuric acid. The gas exits from outlet 11B, with essentially all of the $SO_3$ having passed into the acid. The effluent gas from the intermediate absorber then passes through a second catalytic converter (not shown) where almost all of the $SO_2$ present is converted into $SO_3$. The effluent gas from the second converter then enters the final absorption tower 12, where the last remnants of $SO_3$ are absorbed by the acid circulating in tower 12 and reacted with water injected into tank 12H from 12L to form sulphuric acid. The gas finally exhausts to the atmosphere through a stack (not shown).

As mentioned hereinabove acid strengths and levels in the system are regulated in tanks H through the water addition points L and the transfer lines M to ensure proper acid concentrations and levels for good absorption and drying.

In the drying operation, conventional practice is to use drying acid strengths of between 93% and 98% at entering temperatures of around 50° C. for the 93% acid and up to 80° C. for the 98% acid; the temperature being set by the vapour pressure of the acid. Maximum temperatures of the acid leaving the drying tower are set by the corrosivity of the acid on the equipment on the one hand, and the need to have sufficient acid flow for proper gas-concentrated sulphuric acid interaction on the other. Typical maximum acid temperatures range from 70° C. for 93% acid to 90°–95° C. for 98% acid. Under these drying tower conditions equipment life is generally of the order of five years. The acid strength of the product taken out of pump tank 10H along product line 10M is generally the same as that of the drying acid, i.e., 93%–98%.

The absorption towers use 97.5%–99.5% acid where the total vapour pressure over the acid is the lowest. Acid temperatures range from 50°–85° C. for acid entering the towers and up to 120° C. for acid leaving the towers. Irrigation conditions in the towers normally limit the temperature rise in the absorption systems to 35° C. or less, especially in the intermediate absorber. Under these conditions, corrosion of cast iron is modest and acceptable equipment lifetimes are achievable.

Piping and valve systems, distributors and acid coolers/heat exchangers, are all sensitive to acid turbulence and velocity. Accordingly, velocities are normally set at under 1.4 meters per second. In addition, all points of high velocity or turbulence such as valves, orifices, pump impellers, and the like, are normally installed in more expensive materials such as a fluorocarbon polymer, e.g. TEFLON*, higher alloys such as Hastalloy "C"*, or Lewmet*, or a ceramic material, all of which complicate and add significant cost to the assembly.

* denotes Trade Mark

FIG. 1 is used to also show a flow sheet of an acid plant modified according to the invention wherein the drying tower 10, absorption towers 11, 12, acid distributors D, mist eliminators E, heat exchangers G, pump tanks H, circulating pumps J and the piping and valve system K are formed of a relatively high silicon austenitic stainless steel having the composition 17.5% Ni, 17.5% Cr, 5.3% Si, <0.015% C, the balance being Fe. In this preferred embodiment, the use of this relatively high silicon austenitic steel in the piping and valve system allows of smaller diameter piping because of higher corrosion resistance. Also, the heat exchangers or coolers G are not provided with anodic protection means since operation at the conventional temperatures hereinbefore described permits anodic protection to be dispensed with; and thus provides further simplification of the plant. In the alternative, the corrosion resistance of the austenitic steel allows an increase in operational temperature to 130° C., which is beyond existing piping, valve and other equipment limits, with acceptable corrosion rates.

The following Table I shows the corrosion effect of various strengths of sulphuric acid at various temperatures upon conventional materials and on A611 the preferred material of use in the practice of the invention. The materials were not anodically protected.

Other specific austenitic steels of use in the practice of the invention have composition 17.97% Cr, 17.15% Ni, 5.09% Si, 0.74% Mn, 0.013% C, the balance being substantially Fe, (from BÖHLER, VIENNA, AUS- TRIA) and 17.5% Cr, 17.8% Ni, 5.55% Si, 0.74% Mn, 0.013% C and the balance being substantially Fe.

TABLE I

| Temperature °C. | Corrosion rate mpy (mils per year) | | |
|---|---|---|---|
| | A611* | 316L** | Cast Iron |
| *in (A) 98.2% sulphuric acid* | | | |
| 63 | — | — | 40 |
| 100 | — | — | 60–70 |
| 105 | 0.84 | 64 | — |
| 115 | 4.4 | 101 | — |
| 125 | 4 | 147 | — |
| 135 | 32 | — | — |
| 145 | 64 | — | — |
| *in (B) 93.5% sulphuric acid* | | | |
| 85 | 10 | 163 | — |

*17.5% Ni, 17.5% Cr, 5.3% Si, 0.015% C and the balance is substantially Fe.
**A conventional austenitic stainless steel of composition 18% Cr, 10% Ni, 3% Mo, <0.2% Si, <0.03% C, the balance being Fe.
Specification 17.5 ± 0.5% Cr, 17.5 ± 0.5% Ni, 5.3 ± 0.3% Si, >0.015% C, the balance being substantially Fe; obtained from VEW, BOHLER, VIENNA, AUSTRIA.

Corrosion studies with 70% sulphuric acid show that at 50° C., A611 had a high corrosion rate which was also higher than that of 316L under the same test conditions.

The above results show, quite unexpectedly, the very highly favourable corrosion resistance to concentrated sulphuric acid of A611 over cast iron and 316L. This is in contrast to results obtained in less concentrated acid for A611 and 316L.

Table II shows the comparative corrosion effect of various strengths sulphuric acid at various temperatures on A611 in polarized corrosion tests, i.e., simulated anodic protection tests conducted at steady potential for long terms. The corrosion rates are dependent on the potential applied during the test. The results obtained are for values of potential being a reasonable working range for anodic protection, i.e., −100mV to +200mV.

TABLE II

| Sulphuric Acid Strength % | Temperature °C. | Corrosion Rate mpy |
|---|---|---|
| 98.5 | 100 | 0.77 |
| " | 274 | 5.7 |
| 98.2 | 115 | 0.26 |
| 93.5 | 65 | 0.05 |
| " | 75 | 0.20 |
| " | 85 | 1.15 |
| " | 95 | 0.91 |
| " | 200 | 45 |

Table II shows the favourable effect of anodically protecting A611 when it is to be used in contact with concentrated sulphuric acid.

Thus, with reference to FIG. 1, a more preferred process according to the invention incorporating advantages to enhance energy recovery will now be described.

The plant components are formed of the high silicon austenitic stainless steel having the composition 17.5% Ni, 17.5% Cr, 5.3% Si, <0.015% C, the balance being Fe, as hereinbefore described, except that now the heat exchangers 11G, 12G, pump tanks 11H, 12H, and all the piping and valves between towers 11, 12 and heat exchangers 11G and 12G respectively are provided with anodic protection means (not shown). Further, in view of the difficulty in providing anodic protection to the absorption towers 11, 12, and of the high temperatures experienced at the lower parts of these towers, the inner lower parts are brick lined.

In this embodiment air drying is carried out in drying tower 10 to achieve proper drying at temperatures in the upper range of that previously described. The drying operation is carried out using concentrated acid in the 98% range to allow of the use of higher temperatures more suitable for energy recovery, i.e., 80° C. to 110° C.

In the cooler areas of the intermediate and final absorption systems, namely, the upper part of towers 11, 12, distributors 11D, 12D, mist eliminators 11E, 12E, and the piping between the heat exchangers 11G, 12G and towers 11, 12 respectively, the acid temperature is of the order of 130° C., which is near the maximum temperature allowed for use with a non-anodically protected high silicon austenitic steel.

In the hotter zones of the absorption systems, i.e., those areas where the components are anodically protected as hereinbefore described, namely, the heat exchangers 11G, 12G, pump tanks 11H, 12H, and the piping between towers 11, 12, and heat exchangers 11G, 12G, the acid temperatures are in the range 160° C.–170° C.

The direct result of operating the process according to this embodiment at the stated temperatures is the raising of the energy level in the acid system to levels compatible with energy recovery of significant value. The overall energy efficiency of this sulphuric acid plant can be raised from a conventional level of 60–65% to a level ca 90%.

Reference is now made to FIG. 2, which shows diagrammatically a typical prior art heat exchanger 100 of the kind presently in commercial use in the manufacture of sulphuric acid. Heat transfer equipment such as shell and tube heat exchangers are used to cool sulphuric acid, wherein, generally, the corrosive acid passes around the heat exchanger tubing while water passes through the tubes to cool the fluid circulating outside the tubes, i.e., where the corrosive fluid is on the shell side of the heat exchanger.

The heat exchanger 100 includes an outer shell 120 divided into a water inlet box 14, a water outlet box 16, and a cooling section 18, the three sections being separated by tube sheets 20, 22. Heat exchanger tubes 24 extend between the tube sheets to carry water therebetween. The shell, tube sheets and tubes are commonly made of standard grades of austenitic steels, which in the absence of anodic protection will corrode at an unacceptably rapid rate in the presence of hot concentrated sulphuric acid. The water inlet box 14 and outlet box 16 are formed of carbon steel. Only two tubes 24 are shown in FIG. 2, but in practice there may be more than 1,000 of the tubes 24, packed very closely together with small clearances (typically 0.25 to 0.5 inches) therebetween. Cooling water enters the water inlet box 14 via inlet 26, flows through the tubes 24, and exits from the water outlet box 16 via outlet 28. Hot acid enters the cooling section 18 via an acid inlet 30 and leaves via an acid outlet 32. Conventional baffles 34 are provided to ensure that the acid flows through a tortuous path in the cooling section 18 for maximum cooling.

In operation, when the heat exchanger is not provided with anodic protection means, the tube wall temperatures generally are of the order of 30° C. for 93% acid and 55° C. for 98% acid.

Reference is again made to FIG. 2 which now represents a heat exchanger according to the invention wherein shell 120, tube sheets 20, 22, tubes 24 and baffles 34 are formed of relatively high silicon austenitic stainless steel having the composition 17.5% Ni, 17.5% Cr, 5.3% Si, <0.015% C, the balance being substantially Fe. In operation, this embodiment according to the invention when not provided with anodic protection means has tube wall temperatures of the order of 80° C. for 93% acid and 130° C. for 98% acid.

At temperatures where corrosion rates would be too high to use a conventional austenitic stainless steel heat exchanger, anodic protection is applied.

A conventional anodic protection system is shown in FIGS. 3 and 4. The reference numerals and materials described hereinbefore for the heat exchanger of FIG. 2, i.e., without anodic protection means, are applied and incorporated herein and to FIGS. 3 and 4. FIGS. 3 and 4 also include an elongated cathode 36, typically thirty feet or more in length, which is inserted into the heat exchanger 100 from one end thereof. The cathode 36 consists of a central core 38 of relatively acid resistant alloy, available commercially under the name Hastelloy C276*, surrounded by an insulating sheath 40 of polytetrafluoroethylene perforated with numerous holes 42 to allow the acid in the cooling section to contact the metallic cathode core 38. The sheath 40 prevents grounding of the cathode core 38 on the metal parts of the heat exchanger and avoids transpassivity on baffles and tube sheets in close proximity to the cathode. The cathode 36 is supplied with current from the negative terminal 44 of a DC power supply 46, the positive terminal 48 being connected directly to the shell 120. The power supply 46 is controlled by an automatic controller 50 which in turn is controlled by the potential derived from a reference electrode 52.

* denotes Trade Mark

In operation, such conventional heat exchangers provided with anodic protection means can survive tube wall temperatures of the order of 70° C. for 93% acid and 100° C. for 98% acid.

Reference is again made to FIGS. 3 and 4 which also represent a heat exchanger provided with anodic protection means according to the invention wherein shell 120, tube sheets 20, 22, tubes 24 and baffles 34 are formed of austenitic stainless steel having the composition 17.5% Ni, 17.5% Cr, 5.3% Si, <0.015% C, the balance being substantially Fe.

In operation, this embodiment has tube wall temperatures of the order of 120° C. for 93% acid and 180° C. for 98% acid. Thus, the use of this high silicon steel in the fabrication of anodically protected heat exchangers extends the usable temperature range of operation of such sulphuric acid coolers and permits increased energy recovery from the hot acid.

In an alternative embodiment of the invention the cathode could also be formed of this high silicon austenitic steel for some applications.

FIG. 5 shows a conventional drying tower 10 constructed and operated as part of the sulphuric acid plant as hereinbefore described with reference to FIG. 1.

FIG. 6 shows the drying tower 10 of FIG. 5 modified according to the invention wherein the tower 10, distributor 10D, mechanical pad demister 10E and support 10S are formed of austenitic steel having the composition 17.5% Ni, 17.5% Cr, 5.3% Si, <0.015% C, the balance being substantially Fe; and wherein there is no acid brick lining in the lower part of the tower.

This embodiment is operated as part of the sulphuric acid plant as hereinbefore described with reference to FIG. 1.

The absorption tower of FIG. 7 is constructed and operated as an intermediate tower 11, (and as a final tower 12) as part of the sulphuric acid plant as hereinbefore described with reference to FIG. 1.

FIG. 8 shows the absorption tower of FIG. 7 modified according to the invention wherein the tower 11, distributor 11D, candle type demister 11E and support 11S are formed of austenitic steel having the composition 17.5% Ni, 17.5% Cr, 5.3% Si, <0.015% C, the balance being Fe; and wherein there is no acid brick lining in the tower.

In an alternative embodiment, in addition to the use of the high silicon austenitic steel the tower is lined with acid brick. This allows higher temperatures to exist in these towers than when the high silicon steel is used alone. The absorption towers, according to the invention, are operated as part of the sulphuric acid plant as hereinbefore described with reference to FIG. 1.

Reference is now made to FIG. 9, which as indicated shows a portion of a sulphuric acid concentration system which comprises a vacuum evaporation system and which is in use at the present time by the assignee of the present invention. The apparatus comprises a series of vacuum stages to evaporate water from the weak acid to achieve the desired product concentration. The system includes as a concentrator vessel a first stage evaporator 110 which receives pre-heated feed acid via a conduit 112 from a pre-heater, not shown. The bottom of the evaporator 110 is equipped with a thermosyphon loop 114. The loop 114 has a first leg 116 for downwardly flowing acid and a second leg 118 for upwardly flowing acid, the bottoms the legs being connected together by a conduit 120. The tops of both legs are connected to the bottom of the evaporator 110 at or just below the surface of the acid 122 therein.

Acid in the leg 118 is heated by a tantalum heater 124 containing tantalum tubes (not shown individually) and into which hot high pressure steam is injected at 126 and condensate withdrawn at 128. Convection currents cause a flow of acid downwardly through leg 116 and then upwardly through 118 past the heater 124 where heat is transferred to the acid. Water vapour evaporated from the acid leaves the evaporator 110 via a conduit 130 and is condensed in a direct contact condenser 132. A steam ejector 134 is used to extract air and thus maintain the desired vacuum on the system. A demister pad 136 is incorporated into the evaporator 110 to remove acid drops and mist particles.

The sulphuric acid which has been partially concentrated in evaporator 110 flows by gravity via conduit 138 to the next stage evaporator 140 which is similar in design to the evaporator 110 but which operates at a lower absolute pressure. Typically a booster ejector 141 will be required to raise the pressure in the final stage condenser to achieve satisfactory condensation.

The evaporator 110 and piping used are typically borosilicate glass (Pyrex, trade mark) or glass lined steel to prevent attack by the acid.

The cold feed acid (>85%) is generally pre-heated by the hot product acid (93%) using a tantalum heat transfer surface in a glass or glass-lined steel shell heat exchanger. The product acid after being cooled to storage temperature in a final water cooled heat exchanger is transferred to a pump tank or reservoir by means of an associated piping and valve system.

Anodic protection is preferably provided to all equipment contacting the acid.

FIG. 9 is used to also show an acid concentration system modified according to the invention wherein the concentrator vessel 110 and associated thermosyphon loop 114, heat exchangers, pump tank and the associated piping and valve system are formed of A611 austenitic steel.

The process is operated as hereinabove described with reference to the prior art except that higher operating temperatures (>300° C.) can be attained with acceptable corrosion rates to allow higher strength acid (98%) to be produced.

In an alternative embodiment the complex and expensive vacuum systems and tantalum heating elements and exchangers can be dispensed with. The higher operating temperatures reduces the need for a vacuum system, and replacement of tantalum components with A611 allows of acceptable corrosion rates.

In a further embodiment a concentrator system incorporating A611 components could be used in series with one of the prior art concentrators to concentrate acid up to higher strengths than is presently possible, i.e., up to 98% acid at 290°-300° C.

We claim:

1. In a process for making sulphuric acid from sulfur dioxide and oxygen in a contact process system which employs at least some sulfuric acid stream having a concentration of 90-100% and temperatures of above 40° C., the improvement consisting of the use of a corrosion resistant wrought austenitic steel consisting of 17.5±0.5% Cr, 17.5±0.5% Ni, 4.6-5.8% Si, balance essentially Fe as as the material of construction for the portion of the system in contact with said 90-100% sulfuric acid above 40° C. streams.

2. In a process for making sulfuric acid from sulfur dioxide and oxygen in a contact process system which employs at least some sulfuric acid stream having a concentration of 90-100% and temperature of above 40° C. and one or more gas-concentrated sulfuric acid contacting units A, said unit being optionally provided with a mist eliminator B and an acid distributor C; a heat exchanger D; and a circulation system comprising a pump tank E, acid pump F and a pipe and valve system G, the improvement consisting of the use of a corrosion resistant wrought austenitic steel consisting of 17.5±0.5% Cr, 17.5±0.5% Ni, 4.6-5.8% Si, balance essentially Fe as the material of construction for the whole or a part of one or more of said integers A to G contact with said 90-100% sulfuric acid above 40° C. streams.

3. A process as claimed in claim 2 wherein all of said integers A to G inclusive are formed in whole or in part of said corrosion resistant steel.

4. A process as claimed in claim 2 or claim 3 wherein all of said integers D to G inclusive are anodically protected.

5. A process according to claim 1 or claim 2 wherein the temperature employed is above 90° C.

6. A process as claimed in claim 2 wherein one or more of said integers D to G inclusive is anodically protected.

7. A process as claimed in claim 2 wherein at least one of said contacting units A is a sulfuric acid drying tower formed in whole or in part of said corrosion resistant steel.

8. A process as claimed in claim 2 wherein at least one of said contacting units A is an absorption tower formed in whole or in part of said corrosion resistant steel.

9. A process as claimed in claim 2 wherein said mist eliminator B is formed in whole or in part of said corrosion resistant steel.

10. A process as claimed in claim 2 wherein said acid distributor C is formed in whole or in part of said corrosion resistant steel.

11. A process as claimed in claim 2 wherein said heat exchanger D is formed in whole or in part of said corrosion resistant steel.

12. A process as claimed in claim 2 wherein said pump tank E is formed in whole or in part of said corrosion resistant steel.

13. A process as claimed in claim 2 wherein said acid pump F is formed in whole or in part of said corrosion resistant steel.

14. A process as claimed in claim 2 wherein said pipe and valve system G is formed in whole or in part of said corrosion resistant steel.

15. In a process for concentrating sulfuric acid from a strength of at least 90% acid of the type comprising the step of heating the acid in a concentrator vessel the improvement consisting of the use of a corrosion resistant wrought austenitic steel consisting of 17.5±0.5% Cr, 17.5±0.5% Ni, 4.6-5.8% Si, balance essentially Fe as the material of construction for the portion of the concentrator vessel in contact with said sulfuric acid.

16. A process according to claim 15 wherein said concentrator vessel is anodically protected.

17. A process according to claim 15 or claim 16 wherein said acid is heated under reduced pressure.

18. A process according to claim 15 or claim 16 wherein said at least 90% acid is produced by preconcentrating feed sulfuric acid.

19. A process according to claim 15 wherein said heating is at a temperature above 90° C.

* * * * *